(12) United States Patent
Smith et al.

(10) Patent No.: US 8,800,997 B1
(45) Date of Patent: Aug. 12, 2014

(54) STEPPED COLLET

(75) Inventors: Raymond L. Smith, Royal Oak, MI (US); John V. Bartolone, Shelby Township, MI (US); Dan J. O'Lear, Warren, MI (US)

(73) Assignee: Hydra-Lock Corporation, Mt. Clemens, MI (US)

( * ) Notice: Subject to any disclaimer, the term of this patent is extended or adjusted under 35 U.S.C. 154(b) by 1008 days.

(21) Appl. No.: 12/845,087

(22) Filed: Jul. 28, 2010

Related U.S. Application Data

(60) Provisional application No. 61/229,531, filed on Jul. 29, 2009.

(51) Int. Cl.
*B23B 31/40* (2006.01)
*B23B 31/20* (2006.01)

(52) U.S. Cl.
USPC ........ 279/2.02; 279/2.08; 279/46.4; 279/143; 82/169; 269/48.1

(58) Field of Classification Search
USPC ........... 279/2.01, 2.02, 2.06, 2.07, 2.08, 2.09, 279/4.03, 4.04, 4.05, 4.06, 4.07, 4.11, 4.12, 279/4.1, 43.1, 43.2, 145, 143, 2.05, 2.03, 279/2.04, 4.08, 4.09, 43.5, 46.1, 46.2, 46.3, 279/46.4, 46.5, 2.12; 269/48.1; 82/169
See application file for complete search history.

(56) References Cited

U.S. PATENT DOCUMENTS

| | | | | |
|---|---|---|---|---|
| 674,475 | A * | 5/1901 | Schuster | 82/169 |
| 2,459,453 | A * | 1/1949 | Rieber | 279/2.04 |
| 2,469,198 | A * | 5/1949 | La Pointe | 279/2.09 |
| 2,541,078 | A * | 2/1951 | Lescallette | 451/381 |
| 2,626,811 | A * | 1/1953 | Hohwart et al. | 279/2.09 |
| 2,744,756 | A | 5/1956 | Atherholt, Sr. et al. | |
| 2,797,604 | A * | 7/1957 | Atherholt et al. | 82/169 |
| 2,877,022 | A * | 3/1959 | Parker et al. | 279/2.03 |
| 2,949,313 | A * | 8/1960 | Moser et al. | 279/2.09 |
| 2,971,765 | A | 2/1961 | Atherholt, Sr. et al. | |
| 3,360,968 | A * | 1/1968 | Swindall et al. | 68/189 |
| 3,747,445 | A * | 7/1973 | Piotrowski et al. | 82/169 |
| 3,770,287 | A * | 11/1973 | Weber et al. | 279/2.02 |
| 3,830,509 | A * | 8/1974 | Weber | 279/2.08 |
| 4,088,332 | A * | 5/1978 | Chase | 279/2.04 |
| 5,397,135 | A * | 3/1995 | Smith | 279/2.04 |
| 5,628,592 | A * | 5/1997 | Ringer | 408/97 |
| 5,667,228 | A * | 9/1997 | Fabris | 279/143 |
| 5,711,538 | A * | 1/1998 | Retzbach et al. | 279/2.08 |
| 5,816,581 | A * | 10/1998 | Chase | 279/2.03 |
| 6,978,988 | B2 * | 12/2005 | Chupick | 269/48.1 |
| 7,147,232 | B2 | 12/2006 | Andre, Sr. | |
| 7,331,583 | B1 | 2/2008 | Andre | |
| 7,958,619 | B1 * | 6/2011 | Pletschet | 29/559 |
| 2008/0185793 | A1 * | 8/2008 | Haimer et al. | 279/2.06 |

FOREIGN PATENT DOCUMENTS

JP 2012091253 A * 5/2012

* cited by examiner

*Primary Examiner* — Eric A Gates
*Assistant Examiner* — Paul M Janeski
(74) *Attorney, Agent, or Firm* — Reising Ethington P.C.

(57) ABSTRACT

A stepped collet includes a first section of generally hollow cylindrical shape having a first outer diameter and an inner diameter, a wall extending radially inwardly from an outboard end of the first section, and a second section of generally split cylindrical shape cantilevered from the wall and having a second outer diameter smaller than the first outer diameter.

12 Claims, 6 Drawing Sheets

STEPPED COLLET

CROSS-REFERENCE TO RELATED APPLICATION

This application claims the benefit of U.S. Provisional Application No. 61/229,531, filed Jul. 29, 2009.

TECHNICAL FIELD

The present invention relates to tool or workpiece holding devices and more particularly to collets and holding devices having collets.

BACKGROUND

Various holding devices, like tool holders and work holders for machining workpieces, are known including mechanically actuated and hydraulically actuated types. Such "holders" typically have a sleeve to hold a workpiece or tool by collapsing around the workpiece or tool or by expanding within the workpiece or tool. Mechanically actuated holders usually have a collet that is generally cylindrical and includes a number of leaves that are defined by relief slots that allow the collet to radially expand and contract. The collet also has a tapered portion that cooperates with a corresponding tapered portion of an actuating mechanism that is linearly displaceable to impose a linear force on the tapered portion of the collet. Such linear displacement is converted to radial displacement of the collet via the corresponding tapered portions. Hydraulically actuated holders include those which have one or more chambers containing a fluid which, when pressurized, radially displaces a bladder. In turn, the displaced bladder displaces a circumferentially continuous or slotted sleeve (collet) into engagement with a workpiece or tool.

SUMMARY OF THE INVENTION

A collet according to one implementation includes a generally hollow inboard section including an outer surface, and an inner surface configured to receive a radially outward force, a wall extending radially inwardly from the hollow inboard section, and a generally split outboard section cantilevered from the wall, extending generally parallel with the hollow inboard section, and including an outer surface to cooperate with a workpiece.

According to another implementation, a collet includes an inboard section axially extending along an axis and being of generally hollow cylindrical shape and including an outer surface, and an inner surface configured to receive a radially outward force. The collet also includes a wall extending radially inwardly from the inboard section, and an outboard section extending axially outwardly from the wall and being of generally split cylindrical shape and including an outer surface to cooperate with a workpiece. The collet further includes a first set of displacement reliefs including a first plurality of circumferentially spaced slots radially extending through at least portions of the inboard and outboard sections and axially extending from an outboard end of the outboard section through the wall and through at least a portion of the inboard section. The collet additionally includes a second set of displacement reliefs circumferentially interdigitated with respect to the first set and including a second plurality of circumferentially spaced slots radially extending through at least a portion of the wall and through at least a portion of the inboard section to the outer surface thereof and axially extending from an outboard end of the wall through at least a portion of the inboard section.

According to a further implementation, a stepped collet includes a first section of generally hollow cylindrical shape having a first outer diameter and an inner diameter, a wall extending radially inwardly from an outboard end of the first section, and a second section of generally split cylindrical shape cantilevered from the wall and having a second outer diameter smaller than the first outer diameter.

BRIEF DESCRIPTION OF THE DRAWINGS

These and other objects, features and advantages of the present disclosure will be apparent from the following detailed description of preferred embodiments and best mode, appended claims, and accompanying drawings in which:

DETAILED DESCRIPTION

Figure 1:
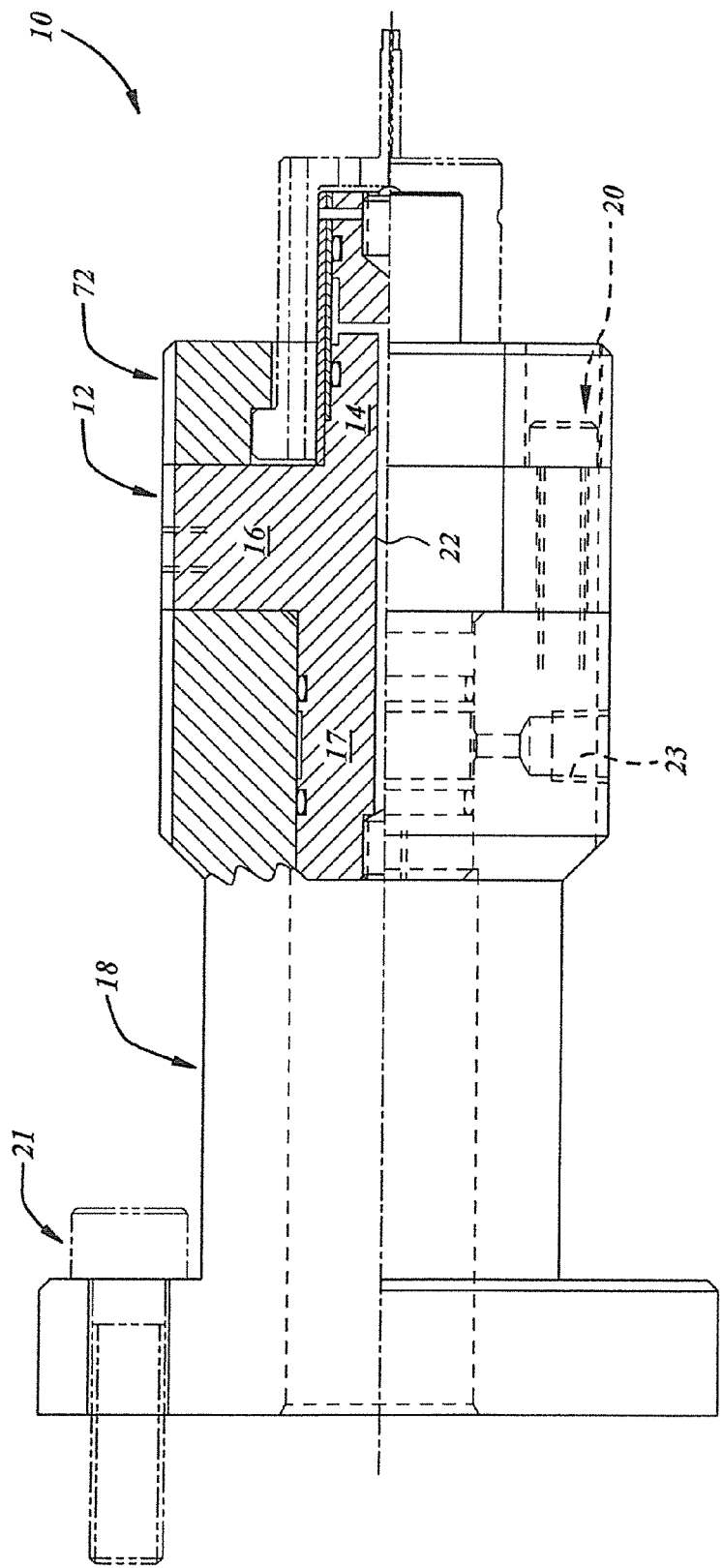
FIG. 1 is a partial sectional view of a presently preferred form of a fluid-actuated arbor.

Referring in detail to the drawings, FIG. 1 illustrates a hydrostatic holding device or holder, and more specifically, a hydrostatic arbor 10 that may be used to hold a tool or a workpiece, for example, for machining and/or grinding the workpiece. The arbor 10 includes a main body 12 that may have a mandrel portion 14, a radially extending flange portion 16, and a mounting portion 17. The body 12 may be constructed to be mounted on a support 18, for example, a machine tool spindle or a support post, by suitable cap screws 20 as shown. In turn, the support 18 may be mounted to another structure (not shown), for example, a machine or bench, by cap screws 21 or any other suitable device(s).

Figure 2:
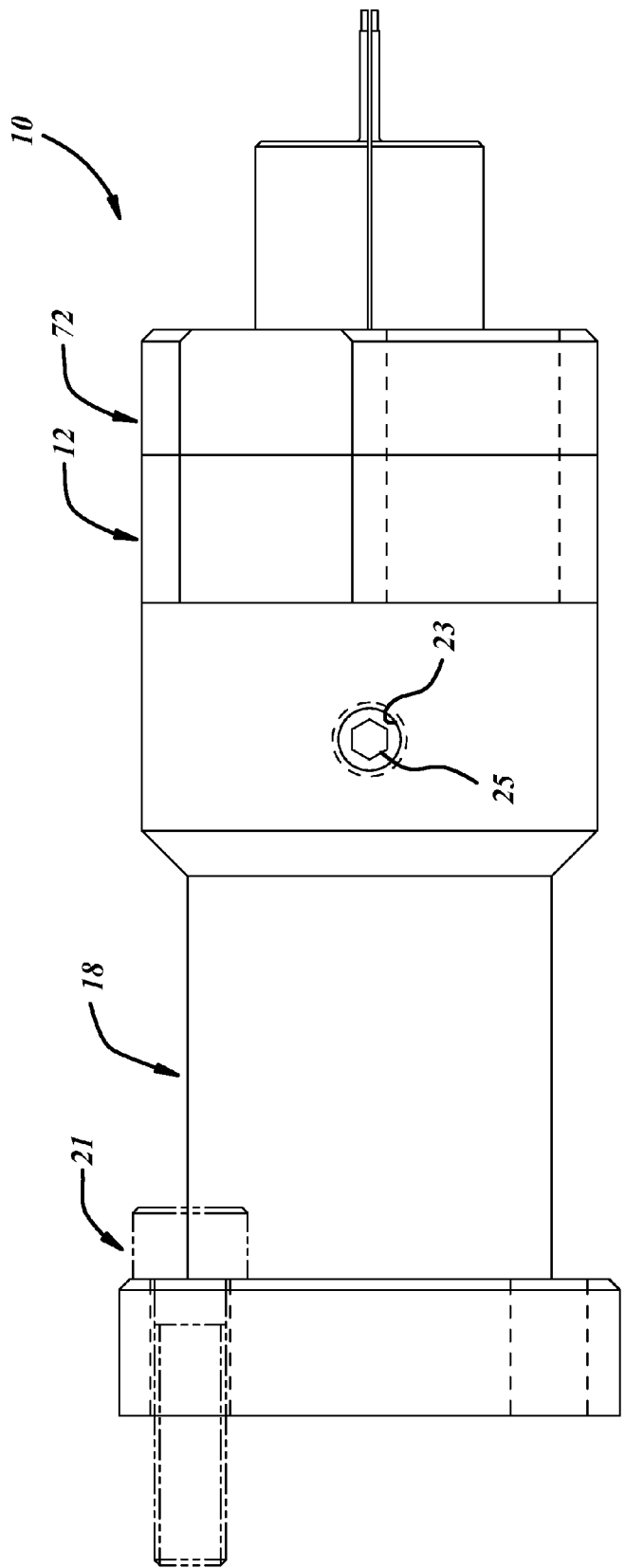
FIG. 2 a bottom view of the arbor of FIG. 1.
Figure 4:
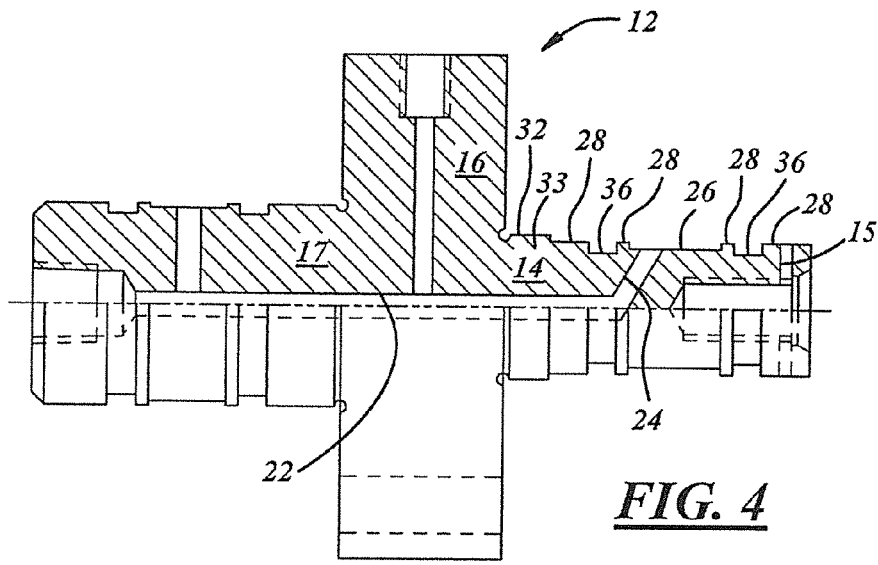
FIG. 4 is a side view of a main body of the arbor of FIG. 1.
Figure 5:
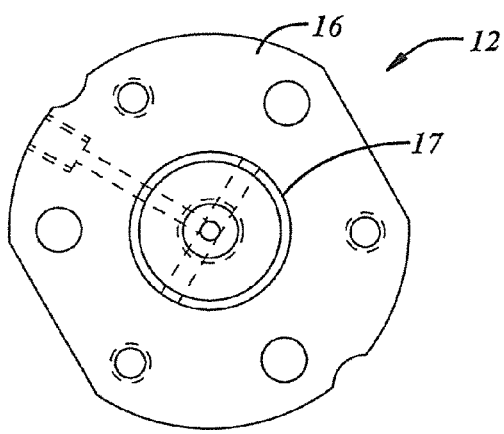
FIG. 5 is an inboard end view of the main body of FIG. 4.
Figure 6:
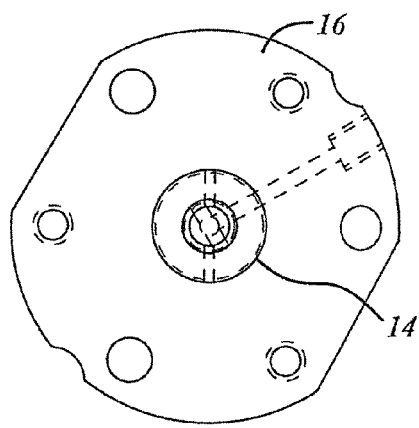
FIG. 6 is an outboard end view of the main body of FIG. 4.

Referring to FIG. 4, the body 12 may include a main fluid passage 22 and one or more branch fluid passages 24 that are constructed to be filled with a pressurized fluid. The fluid passages 22, 24 may be supplied with fluid, which may be pressurized in any suitable manner. In a first example, and referring to FIG. 2, a threaded plug (not shown) may be provided in a threaded passage 23 of the support 18 that communicates with the fluid passages 22, 24. In this example, the plug is threadingly advanced into the passage 23 fluid to compress fluid in the passages 22, 23, 24. In a second example, the fluid passages 22, 24 may be supplied with pressurized fluid from a pump or actuator (not shown) carried by the body 12 or through the support 18 by a remote pump or actuator (not shown).

Referring to FIG. 4, the mandrel portion 14 of the body 12 may include an external annular recess 26 in a first outer diameter or first outer surface 28 of the mandrel portion 14 to at least partially define a fluid chamber 30 (FIG. 1). The mandrel portion 14 may be stepped to include the first outer surface 28 and a larger, second outer diameter or outer surface 32. The mandrel portion 14 also may include one or more radially oriented dowel holes 15 in an outboard end thereof. For example, two dowel holes 15 circumferentially spaced 180 degrees apart may be located adjacent the outboard end of the mandrel portion 14. Also, the mandrel portion 14 may carry resilient polymeric seals 34, such as O-rings, which may be disposed in annular grooves 36 in the mandrel portion 14. The seals 34 may further define and seal the fluid chamber 30.

Figure 1A:
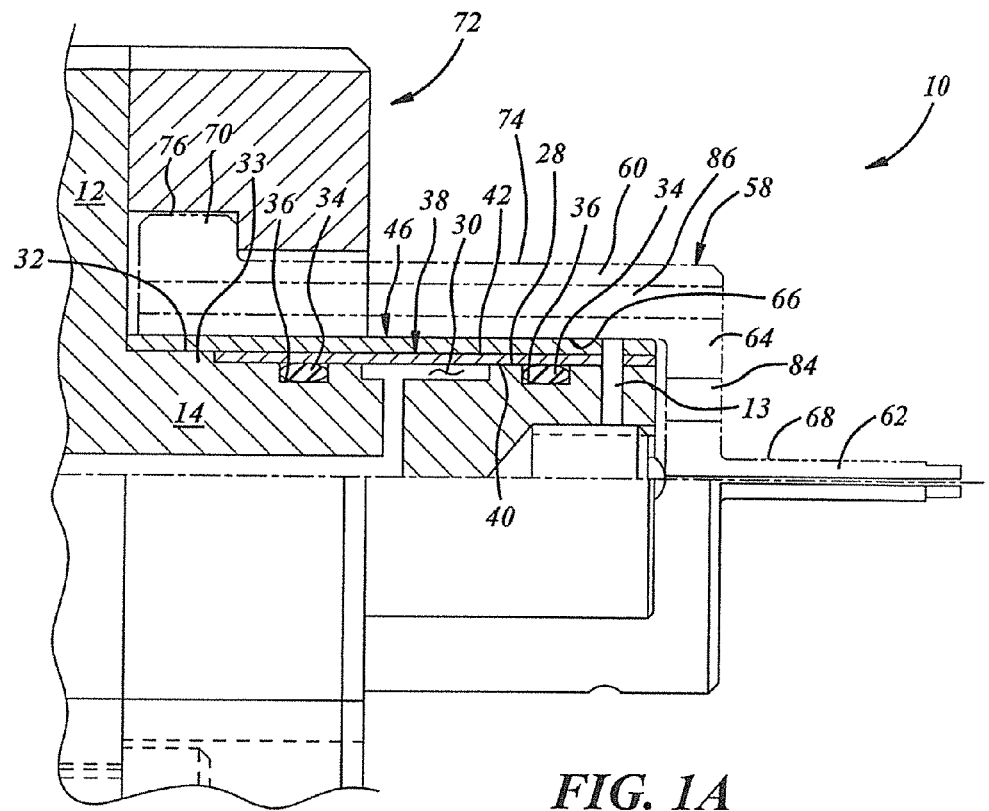
FIG. 1A is an enlarged view of the arbor of FIG. 1.
Figure 3:
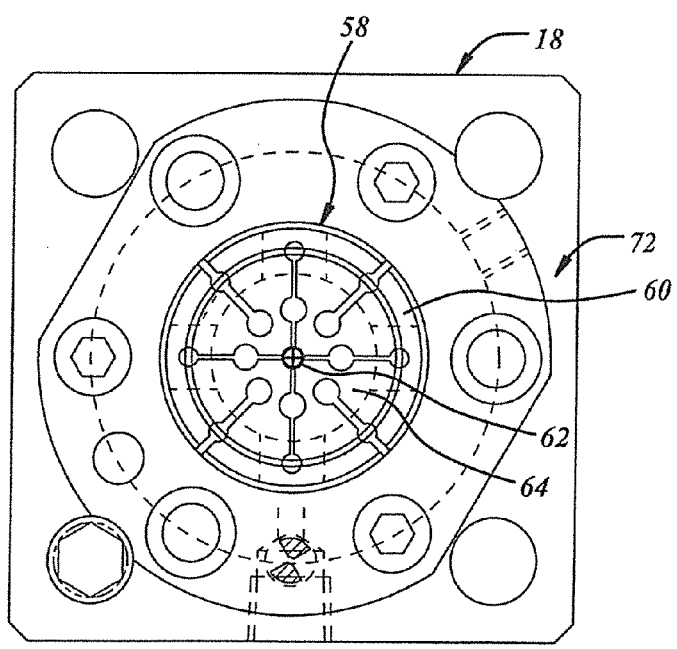
FIG. 3 is an end view of the arbor of FIG. 1.
Figure 7:
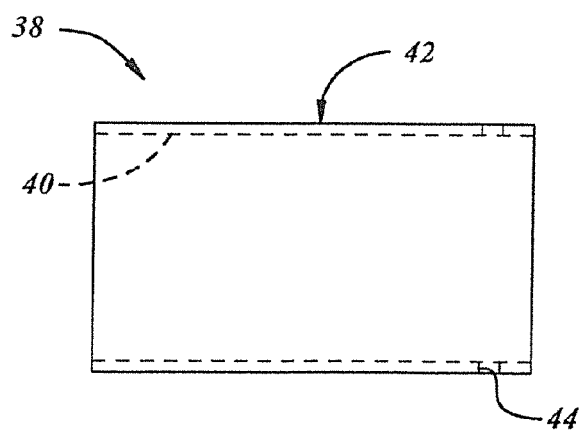
FIG. 7 is a side view of a bladder of the arbor of FIG. 1.

Referring to FIG. 1A, the arbor 10 also may include a circumferentially continuous sleeve or bladder 38 carried by or engaging the main body 12, for example, adjacent to and circumscribing at least part of the mandrel portion 14 of the body 12 to further define the fluid chamber 30. As shown in FIG. 7, the bladder 38 includes an inner cylindrical surface 40 that cooperates with the first outer surface 28 of the mandrel portion 14 of the body 12 (FIG. 1) and further includes an oppositely disposed outer cylindrical surface 42. The bladder 38 may include one or more radially oriented dowel holes 44 in an outboard end thereof. For example, two dowel holes 44 circumferentially spaced 180 degrees apart may be located adjacent the outboard end of the bladder 38.

Figure 8:
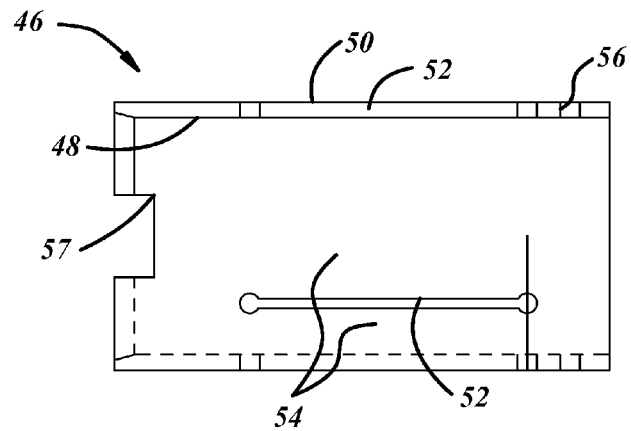
FIG. 8 is a side view of a first split sleeve of the arbor of FIG. 1.
Figures 9, 10:
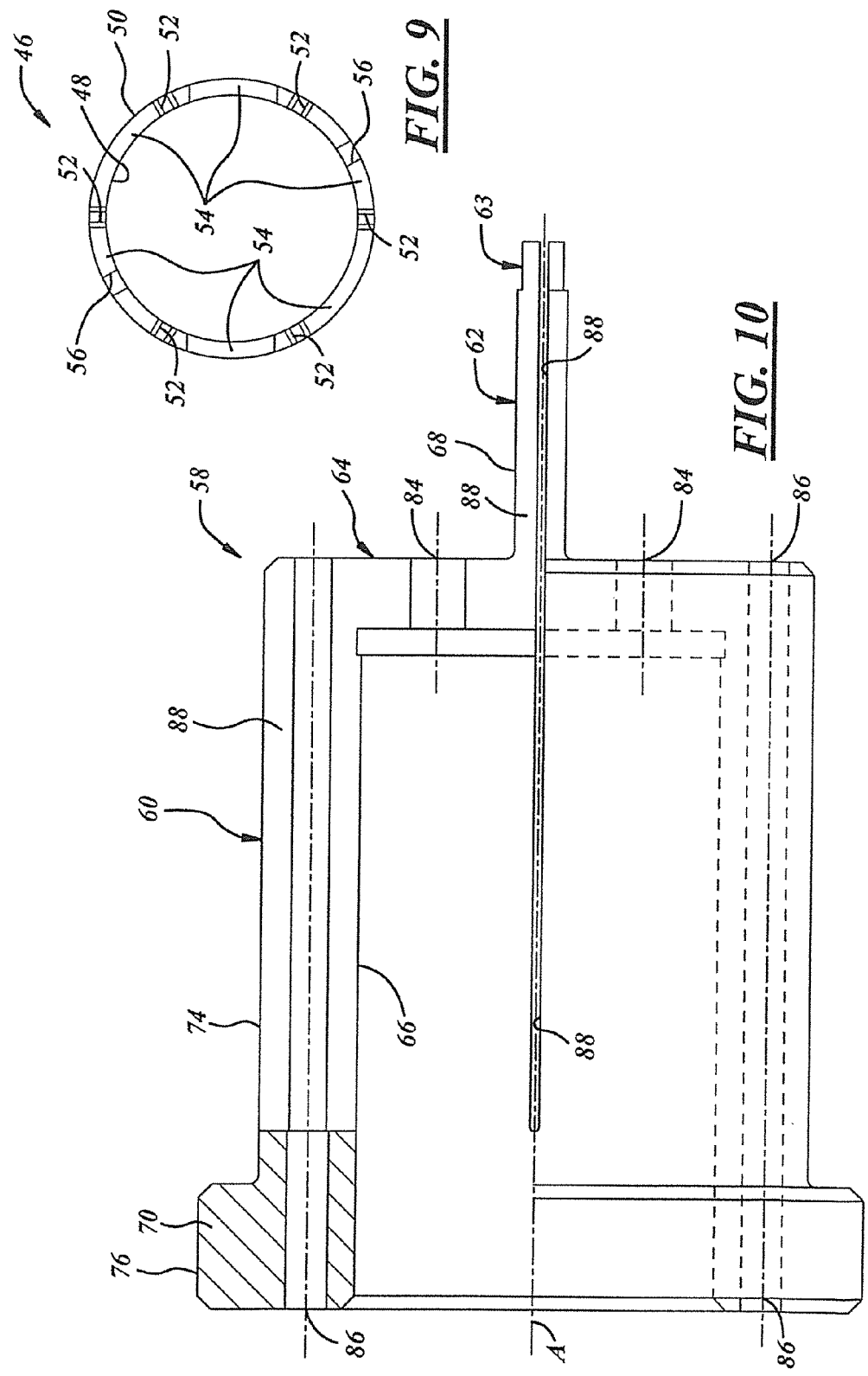
FIG. 9 is an end view of the sleeve of FIG. 8.
FIG. 10 is a partial sectional side view of a collet of the arbor of FIG. 1.

Referring to FIG. 1A, the arbor 10 further may include a first collet or split sleeve 46 carried by or engaging the bladder 38, for example, adjacent to and circumscribing at least part of the bladder 38. As shown in FIGS. 8 and 9, the first split sleeve 46 includes an inner cylindrical surface 48 that cooperates with the outer cylindrical surface 42 of the bladder 38 and further includes an oppositely disposed outer cylindrical surface 50. Any suitable fit may be provided between a ground outer diameter of the bladder 38 and an inside diameter of the first split sleeve 46, for example, a loose fit may be provided, for instance, a 0.0001" diametric clearance fit.

The first split sleeve 46 may be generally tubular or cylindrical and may include a plurality of circumferentially spaced and longitudinally extending through slots or displacement reliefs 52 formed therein such as by milling or electro-discharge machining. The reliefs 52 may be bounded by leaves or bearing sections 54 of the sleeve 46 as shown, or may be formed into ends of the sleeve 46 as is well known in the art of collet design. One or more of the reliefs 52 may sufficiently weaken the sleeve 46 for facilitating radial displacement of at least the bearing sections 54 of the sleeve 46. Any suitable quantity, size, and shape of the reliefs 52 may be used. For example, six, straight circumferentially spaced reliefs may extend axially over 50% of the length of the sleeve 46 and may be terminated at inboard and outboard ends by transversely extending through holes.

The sleeve 46 may include one or more radially oriented dowel holes 56 in an outboard end thereof. For example, two dowel holes 56 circumferentially spaced 180 degrees apart may be located adjacent the outboard end of the sleeve 46. The sleeve 46 further may include two diametrically opposed axial slots 57 in an inboard end of the sleeve 46, for example, to facilitate removal of the sleeve 46 from the assembly.

Referring to FIG. 1A, the arbor 10 additionally may include a second collet or split sleeve 58 carried by or engaging the first split sleeve 46, for example, adjacent to and circumscribing the first split sleeve 46, such that the first and second split sleeves 44, 58 are in a relatively lapped relationship. Any suitable fit may be provided between the sleeves 44, 58, for example, a loose fit may be provided, for instance, a nominal 0.0002" diametric clearance fit with up to an additional 0.0004" clearance.

As shown in FIG. 10, the second split sleeve 58 may be generally cylindrical and stepped to include a first or inboard section 60 and a second or outboard section 62 coupled to the inboard section 60 by a wall 64 of the sleeve 58. The inboard section 60 may be generally tubular or of hollow cylindrical shape, whereas the outboard section 62 may be generally split sold cylindrical shape and may include a stepped portion 63. The inboard and outboard sections 60, 62 may extend generally longitudinally along an axis A and may be generally parallel with one another. The wall 64 may extend from an outboard end of the inboard section 60 in a direction generally transverse with respect to the axis A, for example, perpendicularly (or 90 degrees to the axis A) as shown, or generally radially inwardly at any other non-zero angle to the axis A. The inboard section 60 may include an inner surface 66 that engages the outer cylindrical surface 50 of the first split sleeve 46 and the second outer surface 32 of the body 12. The inboard section 60 further may include an oppositely disposed outer surface 68 to engage a workpiece (not shown). The sleeve 58 may further include an inboard flange 70 for axial abutment with the body flange portion 16.

An outer diameter of the outboard section 62 is smaller than an outer diameter of the inboard section 60. For example, a ratio between the inboard section outer diameter to the outboard section outer diameter may be about 11:1. In another embodiment, the ratio may range from about 10:1 to about 12:1. In a further embodiment, the ratio may range from about 5:1 to about 15:1.

Referring to FIG. 1A, the second split sleeve 58 may be retained to the body 12 by a retainer 72, which may be coupled to the main body 12 in any suitable manner, for example, by cap screws. The mandrel portion 14, bladder 38, and the first split sleeve 46 project into the hollow of the inboard section 60 of the sleeve 58. The wall 64 may axially abut an outboard end of the body mandrel portion 14, the bladder 38, and/or the first split sleeve 46. The outboard section 62 of the sleeve 58 projects axially outboard of the wall 64 and the mandrel portion 14, bladder 38, the first split sleeve 46, and the inboard section 60 of the second split sleeve 58. In other words, the outboard section 62 of the sleeve 58 is generally cantilevered from the rest of the sleeve 58 and the rest of the arbor 10.

Figure 11:
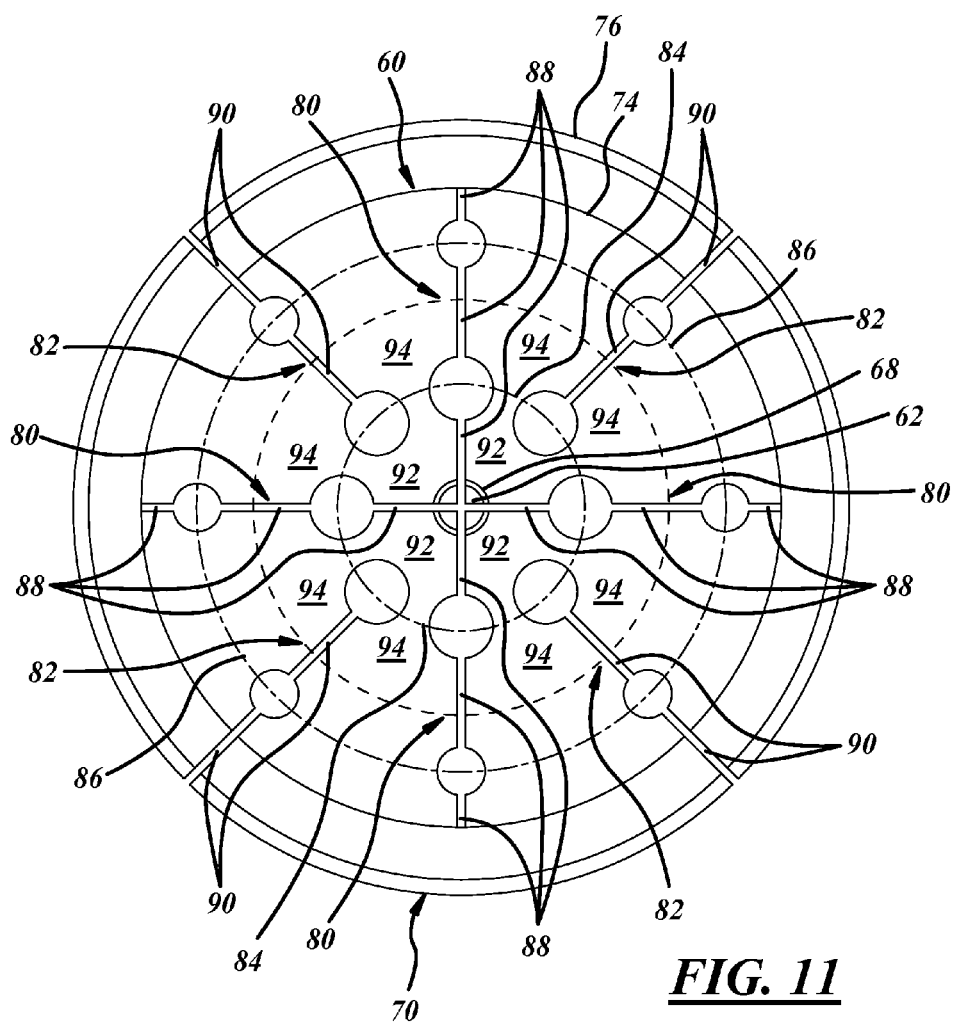
FIG. 11 is an end view of the collet of FIG. 10.

Referring to FIG. 11, the sleeve 58 may include the workpiece outer surface 68 on the outboard section 62, a second outer surface 74 on the inboard section 60, and a third outer surface 76 on the inboard flange 70. Also, the sleeve 58 may include a first set 80 of displacement reliefs and a second set 82 of displacement reliefs circumferentially interdigitated or interspersed with respect to the first set 80. The sleeve 58 further may include a first set 84 of holes that may extend axially through the wall 64, and a second set 86 of holes that may extend axially at least partially through the inboard section 60. The first and second sets 84, 86 of holes may reduce stress concentrations that might otherwise arise as a result of the reliefs being provided in the sleeve 58.

The first set 80 of reliefs may include a first plurality of circumferentially spaced slots 88. The slots 88 may extend radially outwardly from the center of the sleeve 58 through the outboard section 62 and through the wall 64 including through a first subset of the first set 84 of holes and through the inboard section 60 including through a first subset of the second set 86 of holes. Also, the slots 88 may extend longitudinally from an outboard end of the outboard section 62 and through the wall 64 and at least partially through the inboard section 60, for example to the inboard flange 70 or adjacent thereto and spaced therefrom as shown. The slots 88 may split the outboard section 62 into four leaves or fingers. The first subsets of the hole sets 84, 86 may be those depicted at the three, six, nine, and twelve O'clock positions. The first set 80 of reliefs may include the first subsets of the first and second sets 84, 86 of holes.

The second set 82 of reliefs may include a second plurality of circumferentially spaced slots 90. The slots 90 may extend radially outwardly from a second subset of the first set 86 of holes through a portion of the wall 64 and through the inboard section 60 including a second subset of the second set 86 of holes and opening to its outer surface 74 and through the inboard flange 70 and opening to its outer surface 76. Also, the slots 90 may extend longitudinally from an outboard end of the wall 64 and through the inboard section 60 and through the inboard flange 70. The second subsets of the hole sets 84, 86 may be those depicted at the one-thirty, four-thirty, seven-thirty, and ten-thirty O'clock positions. Accordingly, the second set 82 of reliefs may include the second subsets of the first and second sets 84, 86 of holes.

The first set of reliefs 80 may extend radially through the inboard and outboard sections 60, 62 and the wall 64 and may define and may be bounded by a main or first set of bearing sections or leaves 92 of the sleeve 58. The second set of reliefs 82 may be circumferentially interdigitated with respect to the first set 80 and may be open in a radially outward direction to the outer surface 76 of the flange 70. The second set of reliefs 82 may divide the first set of leaves 92 to define and be bounded by subportions or a second set of bearing sections or leaves 94. One or more of the reliefs 80, 82 may sufficiently weaken the second split sleeve 58 to facilitate radial displacement of at least the leaves 92, 94 of the second split sleeve 58.

The sets 80, 82 may include arrays of circumferentially equidistantly spaced reliefs and holes in the quantities shown, or in any other suitable patterns, quantities, and/or spacings. The reliefs and holes sets 80, 82, 84, 86 may be provided in the sleeve 56, for example, by drilling, forming, milling, electro-discharge machining, or in any other suitable manner.

In assembly, and referring to FIG. 1A, the polymeric seals 34 may be stretched over the mandrel portion 14 of the body 12 and positioned into the annular grooves 36. The bladder 38 then may be telescoped or assembled coaxially over the end of the mandrel portion 14 in abutment with a shoulder 33 of the mandrel portion 14 of the body 12 and in sealing engagement with the resilient polymeric seals 34 to compress the seals 34 and seal the fluid chamber 30. Thereafter, the first split sleeve 46 may be assembled over the bladder 38 in abutment with an outboard surface of the mounting flange portion 16 of the body 12. The bladder 38 and the sleeve 46 may be retained to the body 12 in a manner to resist torsion or relative circumferential motion. For example, the arbor 10 may include dowels 13 that may extend radially through the dowel holes 44, 56 of the bladder 38 and the first split sleeve 46 and into the dowel holes 15 of the body 12. Then, the second split sleeve 58 may be assembled over the first split sleeve 46 in abutment with the outboard surface of the mounting flange portion 16 of the body 12. Finally, the retainer 72 may be coupled to the main body 12 to trap the flange 70 of the collet 58 thereto.

In use, a workpiece is disposed over the outer surface 68 of the second split sleeve 58. The workpiece may be a human tooth, cast iron sleeve, a gear blank, or any other workpiece suitable for mounting on an arbor. To firmly hold the workpiece on the arbor 10, fluid under pressure is provided from an external or internal source through the main fluid passage 22 and branch fluid passages 24 (FIG. 4) and into the fluid chamber 30. The force of the pressurized fluid radially outwardly displaces the resilient bladder 38, which firmly engages and radially outwardly displaces the first split sleeve 46. In turn, such displacement radially outwardly displaces the inboard section 80 of the second split sleeve 58. This radial outward displacement simultaneously moves the outboard section 62 in a radially outward direction into firm engagement with an inner surface of a workpiece to firmly hold and accurately locate the workpiece for machining or other operations to be performed thereon.

To remove the workpiece after such operations, the pressure of the fluid supplied to the fluid chamber 30 is decreased or relieved, thereby decreasing the pressure of the fluid in the fluid chamber 30 to thereby relax the bladder 38 and sleeves 44, 58. Thus, the bladder 38 acts as a drive member to radially outwardly urge one or more driven members (first and/or second split sleeves 44, 58) into engagement with the workpiece.

In general, the aforementioned components may be manufactured according to techniques known to those skilled in the art, including molding, machining, stamping, forging, casting, grinding, and/or the like. Also, the arbor 10 may be assembled according to known techniques.

Likewise, any suitable materials may be used in making the components, such as metals, composites, polymeric materials, and the like. The body 12 may be composed of steel, for example SAE 6150, or brass, fiber reinforced polymeric material, or any other suitable material. The bladder 38 may be composed of any suitable material, for example, a polymeric material that may include a thermoset, which may include DELRIN brand material available from DuPont of Delaware. The sleeve 46 may be composed of any suitable material, for example, a metal that may include hardened SAE 4130 or 6150 steel or any other suitable metal. Nevertheless, the sleeve 46 is composed of a material and constructed in a manner to permit outward radial displacement thereof. The second split sleeve 58 may be composed of a metal such as SAE 4130 steel or any other suitable metal. The sleeve 58 may be hardened, for example, to Rc 44/46 and stress relieved before finish grinding and flash chroming. The stepped portion 63 of the outboard portion 62 may be sandblasted, for example, with an 80 grit media, or may be diamond coated. Nevertheless, the second split sleeve 58 is composed of a material and constructed in a manner to permit outward radial displacement thereof.

While the forms of the invention herein disclosed constitute presently preferred embodiments, many others are possible. For example, although disclosed in conjunction with a hydraulic or fluid actuated work holder, the present invention may be implemented in conjunction with a mechanically actuated work holder. For instance, the inner diameter of the inboard section of the second split sleeve could be tapered for cooperation with a corresponding tapered actuator. In another example, those of ordinary skill in the art will recognize that the present teachings readily may be adapted for use with a hydrostatic chuck (not shown) in that the chuck is basically a female version thereof. It is not intended herein to mention all the possible equivalent forms or ramifications of the invention. It is understood that the terms used herein are merely descriptive, rather than limiting, and that various changes may be made without departing from the spirit or scope of the invention.

What is claimed is:
1. A collet composing:
a collet body having an axis, an inboard section having a first end and a generally axially spaced-apart second end, and an onboard second section projecting axially outward of the second end of the inboard section;
the inboard section being generally hollow and including an outer surface, and an inner surface configured to receive a radially outward force moving at least part of the inboard section radially outward;

a flange extending radially outwardly from the inboard section adjacent the first end thereof;

a wall extending radially inwardly from the hollow inboard section adjacent the second end thereof;

the outboard section cantilevered from the wall, being generally split, extending generally parallel with the hollow inboard section, and including an outer surface to cooperate with a workpiece, and the outer surface of the outboard section having a diameter smaller than the diameter of the outer surface of the inboard section;

a plurality of circumferentially spaced apart first slots radially extending through the outboard section, the wall and at least part of the inboard section and longitudinally extending from an axially outer end of the outboard section, through the outboard section, the wall and at least part of the inboard section and terminating short of an inboard end of the flange; and a plurality of circumferentially spaced apart second slots interdigitated with the first slots and radially extending through the flange, the inboard section and only partially into and not through the wall and not into the outboard section and longitudinally extending from and through the flange, the inboard section and the wall and not into the outboard section.

2. The collet of claim 1 wherein a range of ratios of the diameter of the outer surface of the inboard section to the diameter of the outer surface of the outboard section is about 5:1 to about 15:1.

3. The collet of claim 1 wherein a range of ratios of the diameter of the outer surface of the inboard section to the diameter of the outer surface of the outboard section is about 10:1 to about 12:1.

4. An arbor comprising:
a body including a mandrel portion;
a bladder circumscribing at least part of the mandrel portion of the body;
a radially expandable sleeve circumscribing at least part of the bladder and including a plurality of circumferentially spaced and longitudinally extending displacement reliefs;
a collet body having an axis, an inboard section having a first end and a generally axially spaced-apart second end, and an onboard second section projecting axially outward of the second end of the inboard section,
the inboard section being generally hollow and including an outer surface, and an inner surface configured to receive a radially outward force moving at least part of the inboard section radially outward;
a wall extending radially inwardly from adjacent the second end of the hollow inboard section;
the outboard section cantilevered from the wall, extending generally parallel with the hollow inboard section, being generally split and including an outer surface to cooperate with a workpiece, and the outer surface of the outboard section having a diameter smaller than the diameter of the outer surface of the inboard section;
a plurality of circumferentially spaced apart first slots radially extending through the outboard section, the wall and at least part of the inboard section and longitudinally extending through the outboard section, the wall and only part of the inboard section;
a plurality second slots radially extending through the inboard section and the wall and longitudinally extending through the inboard section and the wall but not the outboard section; and the sleeve is received between the bladder and inboard section and underlying at least the portion of each of the slots in the inboard section overlying the bladder.

5. The arbor of claim 4 further comprising a flange extending radially outwardly from the first section adjacent the first end thereof and the second slots extend longitudinally and radially through the flange.

6. The arbor of claim 4 wherein a range of ratios of the diameter of the outer surface of the inboard section to the diameter of the outer surface of the outboard section is about 5:1 to about 15:1.

7. The collet of claim 4 wherein a range of ratios of the diameter of the outer surface of the inboard section to the diameter of the outer surface of the outboard section is about 10:1 to about 12:1.

8. The arbor of claim 4 wherein each displacement relief of the sleeve is disposed circumferentially between and spaced from an adjacent pair of the slots in the inboard section.

9. A collet comprising:
a collet body having an axis, an inboard section having a first end and a generally axially spaced-apart second end, and an outboard section projecting axially outward of the second end of the inboard section,
the inboard section axially extending along the axis and being of generally hollow cylindrical shape and including an outer surface, and an inner surface configured to received a radially outward force moving at least part of the outer surface radially outward;
a wall extending radially inwardly from adjacent the second end of the inboard section;
the outboard section extending axially outwardly from the wall and being of generally split cylindrical shape and including an outer surface to cooperate with a workpiece;
a first set of displacement reliefs including a first plurality of circumferentially spaced slots radially extending through at least portions of the inboard and outboard sections and axially extending from an outer end of the outboard section through the outboard section, the wall and through at least a portion of the inboard section;
a second set of displacement reliefs circumferentially interdigitated with respect to the first set of displacement reliefs and including a second plurality of circumferentially spaced slots radially extending through at least a portion of the wall and through at least a portion of the inboard section to the outer surface thereof and axially extending from an outer end of the wall through at least a portion of the inboard section;
a first set of holes extending generally axially through the wall; and
a second set of holes extending generally axially through the inboard section;
wherein the first set of displacement reliefs also includes first subsets of the first and second sets of holes wherein the first plurality of circumferentially spaced slots extends through the first subsets, and the second set of displacement reliefs also includes second subsets of the first and second sets of holes wherein the second plurality of circumferentially spaced slots extends from the second subset of the first set of holes and through the second subset of the second set of holes.

10. The collet of claim 9 wherein the inboard section also includes a flange adjacent the first end of the inboard section, and the first plurality of circumferentially spaced slots also extends longitudinally to a location adjacent to and spaced from the flange, and the second plurality of circumferentially spaced slots also extends longitudinally through the flange.

11. The collet of claim 9 wherein a range of ratios of the diameter of the outer surface of the inboard section to the diameter of the outer surface of the outboard section is about 5:1 to about 15:1.

12. The collet of claims 9 wherein a range of ratios of the diameter of the outer surface of the inboard section to the diameter of the outer surface of the outboard section is about 10:1 to about 12:1.

\* \* \* \* \*

UNITED STATES PATENT AND TRADEMARK OFFICE
CERTIFICATE OF CORRECTION

| | | |
|---|---|---|
| PATENT NO. | : 8,800,997 B1 | Page 1 of 1 |
| APPLICATION NO. | : 12/845087 | |
| DATED | : August 12, 2014 | |
| INVENTOR(S) | : Raymond L. Smith et al. | |

It is certified that error appears in the above-identified patent and that said Letters Patent is hereby corrected as shown below:

In the Claims,

Col 6, Line 61, delete "composing" and insert --comprising--.

Signed and Sealed this
Sixth Day of January, 2015

Michelle K. Lee
*Deputy Director of the United States Patent and Trademark Office*